(12) United States Patent  
Fogelman et al.

(10) Patent No.: US 9,114,330 B2
(45) Date of Patent: Aug. 25, 2015

(54) SYSTEM AND PROCESS FOR AN ACTIVE DRAIN FOR GAS-LIQUID SEPARATORS

(75) Inventors: Kimber D. Fogelman, Hockessin, DE (US); Edwin E. Wikfors, Landenberg, PA (US); Terry A. Berger, Englewood, FL (US)

(73) Assignee: Agilent Technologies, Inc., Santa Clara, CA (US)

( * ) Notice: Subject to any disclaimer, the term of this patent is extended or adjusted under 35 U.S.C. 154(b) by 141 days.

(21) Appl. No.: 13/825,128

(22) PCT Filed: Sep. 20, 2011

(86) PCT No.: PCT/US2011/052426
§ 371 (c)(1),
(2), (4) Date: Mar. 20, 2013

(87) PCT Pub. No.: WO2012/040252
PCT Pub. Date: Mar. 29, 2012

(65) Prior Publication Data
US 2013/0180404 A1    Jul. 18, 2013

Related U.S. Application Data

(60) Provisional application No. 61/384,318, filed on Sep. 20, 2010.

(51) Int. Cl.
*B01D 19/00* (2006.01)
*B01D 15/10* (2006.01)
*B01D 15/40* (2006.01)

(52) U.S. Cl.
CPC ............ *B01D 19/0036* (2013.01); *B01D 15/10* (2013.01); *B01D 19/0057* (2013.01); *B01D 19/0063* (2013.01); *B01D 15/40* (2013.01)

(58) Field of Classification Search
CPC ...... B01D 15/08; B01D 15/10; B01D 15/242; B01D 15/247; B01D 15/40; B01D 19/0036; B01D 19/0057; B01D 19/0063
See application file for complete search history.

(56) References Cited

U.S. PATENT DOCUMENTS

| 5,256,171 A | 10/1993 | Payne |
| 5,266,192 A | 11/1993 | Ligon et al. |
| 5,355,901 A | 10/1994 | Mielnik et al. |
| 2002/0070169 A1 | 6/2002 | Berger et al. |
| 2007/0251386 A1* | 11/2007 | Swank et al. .................. 95/271 |

(Continued)

FOREIGN PATENT DOCUMENTS

CN          101413933 A         4/2009

OTHER PUBLICATIONS

Chinese Office Action dated Jul. 28, 2014.
(Continued)

*Primary Examiner* — Robert Clemente

(57) ABSTRACT

A device includes a gas-liquid separator that receives and separates a biphasic pressurized flow stream and delivers flow to at least one exit port enriched in vapor phase composition and at least one exit port enriched in liquid phase composition. The device further includes a low restriction inlet conduit in communication with the separator exit port enriched in liquid phase composition, and a positive displacement pump having an inlet port in communication with the inlet conduit to receive flow from the gas-liquid separator and an outlet port in communication with an outlet conduit.

5 Claims, 10 Drawing Sheets

(56) References Cited

U.S. PATENT DOCUMENTS

| | | |
|---|---|---|
| 2008/0010956 A1 | 1/2008 | Fogelman et al. |
| 2010/0040483 A1 | 2/2010 | Berger et al. |
| 2010/0077874 A1 | 4/2010 | Kanomata |

OTHER PUBLICATIONS

European Search Report dated Nov. 27, 2014.

* cited by examiner

SYSTEM AND PROCESS FOR AN ACTIVE DRAIN FOR GAS-LIQUID SEPARATORS

STATEMENT OF PRIORITY

The present application is a U.S. national phase application under 35 USC §371(c) of International Application Pub. No. WO/2012/040252 filed on Sep. 20, 2011, naming K. Fogelman et al. as inventors. The entire disclosure of International Application Pub. No. WO/2012/040252 is hereby incorporated by reference in its entirety. This application claims the benefit of U.S. Provisional Application No. 61/384,318 filed 20 Sep. 2010.

FIELD OF THE INVENTION

The present invention relates to systems and processes for high and low pressure gas-liquid separators.

BACKGROUND

Supercritical fluid chromatography (SFC) is a separation technique similar to high performance liquid chromatography (HPLC), except one of the fluids used as a solvent is a highly compressible liquefied gas. Supercritical fluid extraction (SFE) is a related technique but with somewhat lower requirements for accurate flow or pressure control. The most common fluid used in SFC (and SFE) is carbon dioxide ($CO_2$), which will be considered as representative of all such fluids.

At room temperature and atmospheric pressure, carbon dioxide is a low density gas (density approximately 0.002 g/cm3). The desirable characteristics of carbon dioxide for SFC and SFE are only achieved when the carbon dioxide is held at a liquid-like density, usually between 0.6 and 1.0 g-cm-3, by raising its pressure to 80 to 600 Bar, while keeping the temperature in the general range of 20° to 100° C., and more commonly between 35 to 60° C. Under such conditions, the carbon dioxide: 1) acts as a solvent, 2) exhibits very high solute binary diffusion coefficients (allows higher flow rates than in HPLC), and 3) exhibits very low viscosity (generates lower pressure drops across columns compared to HPLC).

To be useful in SFC (or SFE), the carbon dioxide is compressed to high pressures and pumped as a liquid or as a supercritical fluid, at a liquid like density, through a separation column. To prevent it from expanding to atmospheric pressure in the column, a back pressure regulator (BPR) is typically placed downstream to keep the column outlet pressure typically above 80 Bar. Detectors capable of operating under high pressure may be mounted between the column and the BPR. Low pressure detectors may be mounted in the flow stream directly downstream of the BPR.

Several problems exist with the recovery of purified liquid fractions from gas-liquid separators used in preparative supercritical fluid chromatography [SFC] systems. Preparative SFC uses near-critical temperature carbon dioxide [$CO_2$] at supercritical pressures [>72.9 bar] as one major constituent of the mobile phase and liquid organic modifiers as the other. At high pressures, these components as well as high levels of dissolved solids requiring purification are soluble and/or miscible into a single fluidic phase. The combined mobile phase entrained with aliquots of dissolved sample is passed through a separation column from which purified flow segments of the sample called "peaks" emerge. It is the goal of the preparative SFC system to direct individual peaks either to clean, empty containers or to containers filled previously with peaks containing the same solute from prior injections—a process known as "pooling."

At the end of the Prep SFC chromatographic process, peaks pass through a back pressure regulator which relieves the fluid of the high pressure required for separation. This rapid pressure reduction causes an immediate expansion of the $CO_2$ component to a gas—a process which is highly endothermic. Hence, the original mobile phase of the flow line carried away from the back pressure regulator becomes biphasic with a very cold mixture of $CO_2$ and modifier vapor and liquid modifier containing the dissolved solutes of the peak.

The $CO_2$ evaporation process following the backpressure regulator is a very turbulent and chaotic process where the original mobile phase is transformed into a rapidly expanding vapor cloud containing very small droplets, or aerosols, of original liquid modifier saturated with $CO_2$. The flow rate of the vapor is limited by the kinematic viscosity of the particular gasses that comprise it—in this case $CO_2$ with a small amount of organic vapor. Because of the inherent pressure differential between the exit of the BPR and the downstream path, the vapor continues expanding not just due to the phase change, but due to the pressure differential of the flow line constraining it. Thus, the $CO_2$ vapor velocity actually accelerates as it moves down the flow line.

In current commercial Prep SFC systems with flows exceeding 5-10 mL/min, the expanding flow stream is generally first passed through a heater then on to one or more gas liquid separators which vent the vast majority of vapor out a vent port while retaining or transferring the liquid component containing solute to an appropriate storage container.

The original gas-liquid separators for Prep SFC were high pressure cyclonic separators that maintained an internal pressure of five or more bar to limit the expansion of the $CO_2$ during the liquid separation process. High velocity streams of the vapor/aerosol mixture were introduced tangentially to a cylindrical separator, which typically had a tapered bottom and an axial vent extending through the top. The flow would continuously be redirected by the separator wall to develop a circular flow pattern. The dense components would collect near the wall due to higher momentum forces. As a result, the heavier aerosols would build up to form a film on the container wall and fall to the bottom under forces of gravity, while the vapor components would find the central path to the vent of least resistance.

Cyclonic separators were not perfect, and a percentage of the original aerosol, containing valuable analytes held in suspension, typically found a path to the vent as well, causing loss of sample and possible contamination of downstream components. Further, the separators were expensive and had to be built for a specific capacity (typically less than one-third of the container volume) to allow sufficient room for expansion of the entering vapor cloud. Once the limited liquid capacity of the separator was reached, the container had to be emptied. One means was by opening a valve which released the $CO_2$-saturated liquid to an external container, which caused a violent outgassing and potential rupture of the container. A second means was to depressurize the container, then empty it, which was inefficient and time consuming. Finally, because the collection process deposits thin films of solute-laden liquid on the walls, each separator must be thoroughly cleaned (typically manually) before re-use with a different collection peak, which again was inefficient and time-consuming.

In prior cyclonic separators for each injection, a separate separator was used to collect an individual peak. The cyclones were typically connected in series with three way-valves either diverting to the collector or passing the flow onto the next collector. A final cyclone in the series collected the waste stream. Such systems were most frequently used isocratically (i.e. no change in the modifier composition during a separation) with a series of repeat injections of the same sample. This pooling process is used to purify larger quantities of material than can be well separated by a single injection. The serial nature of collection through cyclonic separators can introduce an additional difficulty. As fractions are collected first by one cyclone and then the next, the delay period between detection and collector shifts. This time shift is a function of tubing size and flow rate and must be accounted for in accurate fraction collection. Missing the time window by as much as a few seconds can cause contamination of the previously pooled fractions and require repurification.

Another prior preparatory SFC fraction collector with open bed fraction collection uses a low backpressure gas-liquid separator which drains continuously at a rate slightly greater than liquid is added. Exiting modifier is directed to a delivery probe via a transfer line at the bottom of the separator. Because the separator is continuously drained, it can be relatively small and easily rinsed. Since it does not accumulate liquid, the next peak entering the separator, even at relatively close timing, should be relatively immune to mixing with the immediately prior peak. As a result, this system has the decided advantage that a single gas liquid separator can handle all fractions from a given injection. The individual fractions are simply diverted to separate containers in the robotic bed.

Timing is a critical element of the success of this system. From the time a peak is detected and or confirmed to the time it will reach the probe divert valve is a critical value. In addition, there is a strong desire not to cause the liquid of the peak to become overly dilute or "broadened" after the detector to the point where it cannot be seen. Factors that can vary this timing can dramatically interfere with both recovery and purity of collected fractions.

One such factor, the drain rate, is controlled by a combination of backpressure, modifier viscosity, and transfer line flow resistance and so must be carefully implemented for a given system. Since the goal is to completely remove entering liquid without accumulation in the splitter, a small amount of the vapor is inevitably entrained in the transfer line as well. For any given isocratic separation, the conditions can be relatively easily adjusted to give reasonable results. However, a problem arises for gradient separations which constitute the primary intended use of the system. Gradient separations are those that systematically alter the mobile phase composition or flow rate during the course of a single injection. A linear modifier gradient changes the composition of modifier continuously over the course of a separation. A step gradient may hold the composition constant for a time them abruptly change the composition. A flow gradient may simply vary the total or modifier flow rate according to some programmed profile.

Varying modifier and/or total flow in the system introduces the following problem. The system conditions must be set to accommodate the highest level of modifier flow at the lowest pressure condition. As a result, the transfer line must be less restrictive than it ordinarily might be for conditions of low modifier at the beginning of a gradient. The unrestrictive line will pass a significant amount of vapor under these conditions and potentially cause difficulty at the probe due to spraying. In addition, the timing of peaks being delivered to the probe becomes much more variable as more gas in entrained at constant pressure. This is because the gas pushes the liquid at indeterminate speeds through the transfer line as a function of pressure drop along the line. Thus it is very difficult to time the start and stop of collection at the probe tip. The problem becomes much worse as the user varies modifier viscosity. At low viscosities such as methanol (0.3 cp) a fairly restrictive tube still carries a significant flow at moderate pressure. As a result, the flow of vapor through the tube is rather limited. If, however, the modifier is changed to n-butanol (cp>2.9 cp) the tube must be made 10-fold less restrictive for the same flow range. Now at least ten times more vapor is released to the probe and can cause serious problems with timing, dispensing and aerosol formation.

Prior systems have taken some unusual steps in an attempt to overcome these problems. First, a makeup pump is added to the system for the purpose of delivering a fixed rate of modifier to the separator. The makeup pump is programmed to a reverse flow gradient, initially delivering a high flow rate and tapering if a smaller rate as the gradient delivers more modifier. Thus, a maximum amount of modifier most be collected at all times by the system. Second, users are advised to use only a single modifier viscosity to avoid having to change flow lines. The result is a significantly less flexible system than desired with unnecessarily large fractions collected due to the makeup flow.

A solution is therefore needed for both high and low pressure gas-liquid separators to provide substantially better deterministic draining to remote containers.

SUMMARY OF THE INVENTION

An invention that accomplishes a deterministic drainage rate of variable volume and viscosity liquid fractions from a gas-liquid separator is described. The various embodiments include methods and systems that effectively create an active drain for high and low pressure gas-liquid separators. The mechanisms and methods thereof create a flow path from the separator that dramatically favors controlled liquid mass flow over a wide range of flow rates and viscosities while restricting gas mass flow. This is done by active metering using a specialized pump that isolates discrete flow volumes whose volumetric flow is typically unaffected by positive and negative pressure gradients of the external flow path. The invention is a superior method of drainage over conventional systems that employ pressure, vacuum, isolation valves and/or passive flow restrictors to achieve drainage of the separators. The embodiments are primarily directed to the fields of preparative supercritical fluid chromatography (SFC) and supercritical fluid extraction (SFE). However, other fields of technology that use gas-liquid separators are contemplated to be encompassed by the claimed invention, and utilization of the embodiments are possible where phases of dramatically different density, viscosity and volumetric flow rate require separation.

FIGURES

For a better understanding of the nature of the present invention, reference is made to the following figures and detailed description, wherein like elements are accorded like reference numerals, and wherein.

DETAILED DESCRIPTION

Figure 1:
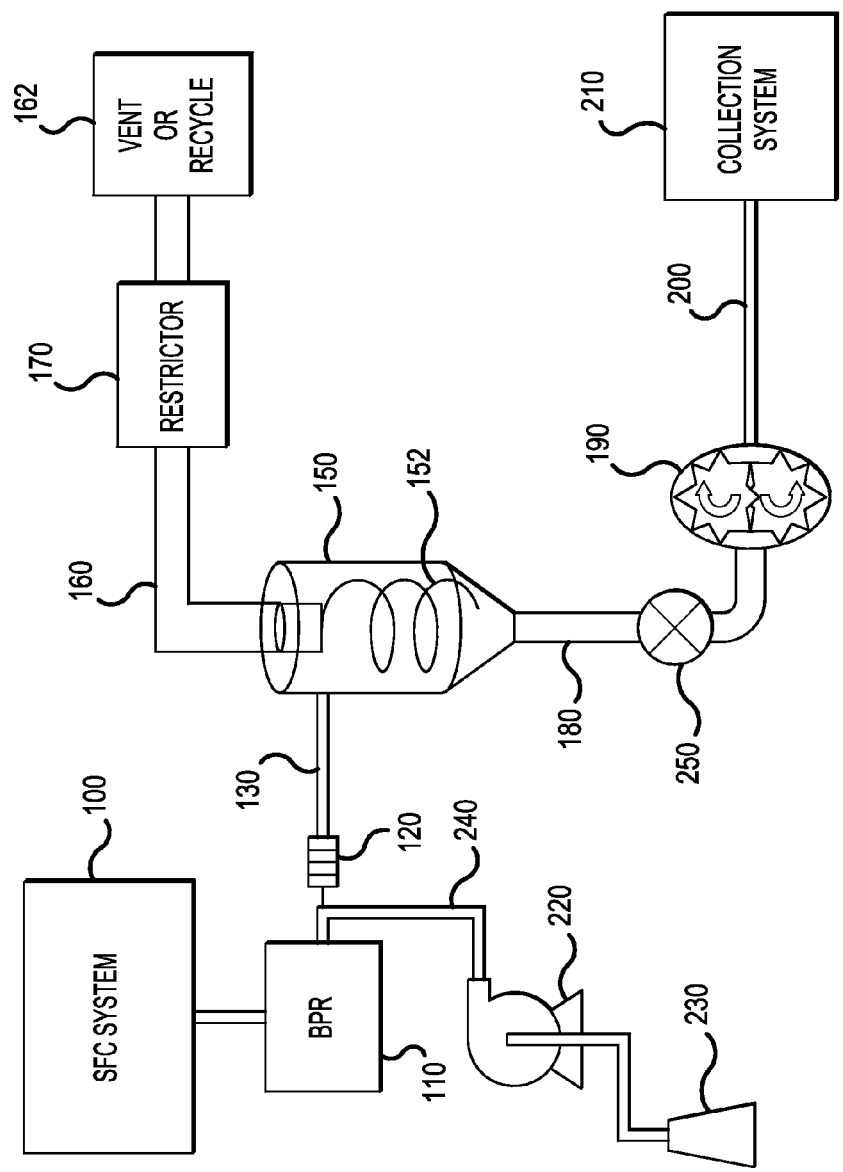
FIG. 1 is a process flow diagram of an illustrative embodiment that includes the collection end of a preparative SFC system.

FIG. 1 illustrates a schematic process flow diagram of an illustrative embodiment that includes the collection end of a preparative SFC system. In this figure, chromatographic SFC system 100 is comprised of necessary fluid sources, pumps, injectors, separation columns and detectors to effectively allow injection of a sample mixture into the system and create a time and flow segment separated stream of "peaks" containing individual dissolved compounds of interest. The fluid carrier, or mobile phase, of the flow stream is comprised of a mixture of near supercritical carbon dioxide, or equivalent carrier stream, and an organic modifier such as methanol, ethanol or isopropanol. The carbon dioxide (C02) is maintained well above its critical pressure during the chromatographic process by backpressure regulator (BPR) 110.

Immediately following BPR 110, the mobile phase experiences a large pressure drop typically on the order of 60 to 200 bars. This brings the C02 of the mobile phase well below its critical pressure and allows it to return to a gas state. Evaporation of the C02 is a highly endothermic process. In addition, the sudden expansion of the C02 gas within the flow path is also a high chaotic process which tends to divide the residual modifier liquid into fine droplets called aerosols. Depending on the type of gas-liquid separator used, an optional heater assembly 120 may be employed to restore heat of vaporization to the flow system. Heater assembly 120 may also consist of an arrangement of heating and depressurization steps within coiled tubing that effectively convert the entrained aerosols to a continuous liquid film on the inner walls of the transfer tubing that is moved downstream by shear forces of the expanding C02 flow.

The biphasic pressurized flow stream from BPR 110 or optional heater assembly 120 is delivered via tube or conduit 130 to gas-liquid separator 150. Generally, the separator 150 that receives and separates the flow stream and delivers flow to at least one exit port enriched in vapor phase composition and at least one exit port enriched in liquid phase composition. When entering separator 150, if the flow stream continues to entrain a high level of aerosols, a conventional gas-liquid separator may be used as the separator 150, such as a cyclonic type separator, in which case the aerosol spray is introduced into the separator 150 at high speed and tangential to the cylinder wall. The gas and liquid flow develops a spiral flow pattern 152 with the heavier aerosol droplets directed to the wall by centrifugal forces. Once at the wall the liquid develops a sheeting flow which spirals down the separator wall by gravity to the bottom of the separator 150. Vapor is directed out of the separator 150 through a vent and vent line 160 at the top of the separator 150. Cyclonic separators are typically maintained at relatively high pressure on the order of 10 to 20 bars by restrictor 170 in vent line 160. The purpose of the restriction is first to control the linear velocity of C02 entering the separator 150 to reduce shear on the aerosol of liquid film and second to maintain a pressure that allows facile recycling of the C02 in larger flow systems. Escaping gasses or vapors through vent line 160 may be vented or directed to a recycling and/or recovery system at block 162.

Figure 10:
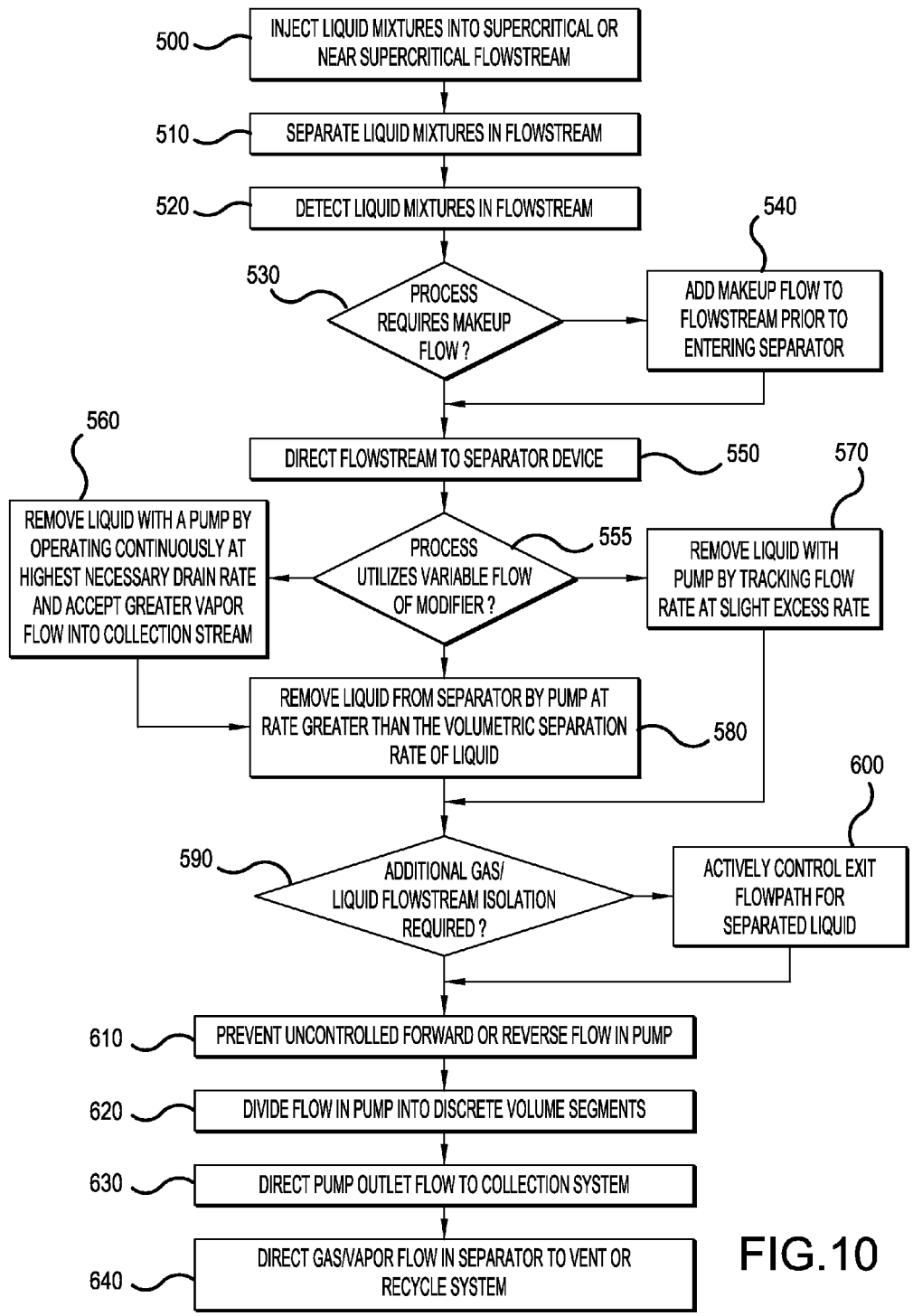
FIG. 10 is a process flow diagram for a method of the preferred and alternative embodiments of the invention.

The system and mode of operation of the embodiment, illustrated in FIG. 1 and the process flow diagram of FIG. 10 are as follows. Liquid mixtures are injected into supercritical or near-supercritical flowstream at block 500, separated at block 510, and detected at block 520 with supercritical or near-supercritical mobile phases in SFC system 100. Peaks emerging from SFC system 100 pass through BPR 110 and the flow stream becomes biphasic at low pressure. The biphasic flow stream enters separator 150 at block 550. The vapor phase is allowed to exit at block 640 thorough the vent line 160 at flow rates based on pressure of the separator cavity to vent or recycle. Liquids are removed by operation of pump 190 at volumetrically controlled flow rates that pass liquids at rates slightly greater than the filling rates and a minor amount of vapor at block 580, which serves to segment the liquid flow and prevent laminar mixing with subsequent flow segments. It is the active draining by pump 190 to provide a well constrained volumetric flow that significantly favors liquids over gasses which defines the embodiments of this application. That is, operation of pump 190 accomplishes a deterministic drainage rate of variable volume and viscosity liquid fractions from the separator 150.

By operating the drain pump 190 to remove liquid from the separator 150 at flow rates greater than the rate of liquid entry at block 580, no pooling of the liquid occurs within the separator 150 and the risk of two subsequent peaks remixing is significantly reduced. Use of pump 190 allows mobile phase modifiers of a wide range of viscosities to be drained from the separator 150 at the same rate compared to use of pressure and restrictor based systems. In the case of variable flow of modifier into the separator 150, as in gradient chromatography, as determined at block 555, pump 190 can track the flow rate at a slight excess rate at block 570 or operate continuously at the highest necessary drain rate and accept more vapor into the collection stream at block 560.

Alternately, if the flow stream entering the separator 150 has been preconditioned to be highly attenuated of aerosols, a low pressure gas-liquid separator may be used. In such a case, the flow may be directed more orthogonally to the wall to minimize the distance of airborne travel of the liquid. Larger liquid droplets striking the wall again form a sheeting flow that is pulled by gravity to the bottom of the container. Linear velocity is generally controlled by a combination of low level back pressure (e.g., <4 bar) and high cross sectional area of the tube delivering flow to the separator 150.

In either separator, the recovered liquid phase drains to the bottom of the gas-liquid separator 150. Inlet conduit 180 is a low restriction tube in communication with separator 150 at the bottom, e.g., at an exit port enriched in liquid phase composition. The low restriction inlet conduit 180 is expected to allow free flow via gravity or pressure to the inlet port of pump 190. This pump 190 has several specifications. First, it should have limited uncontrolled flow. The pump 190 should not allow appreciable uncontrolled flow of liquid or vapor in the forward or reverse direction as the result of pressure within the design specification at block 610. The pump body should be able to withstand the maximum pressure of the cyclone under standard operation. Valveless pumps or active check valve pumps are allowed. Passive check valve pumps are not desirable as they will allow uncontrolled flow to pressure in the forward direction. The second requirement is a mode of operation of pump 190. In one embodiment, the pump 190 is a positive displacement pump that operates using positive displacement as the mode of pumping. In such a configuration, pump 190 divides flow into discrete flow segments at block 620, and transfers the discrete flow segments across a pressure differential, which may be biased in either direction during controlled operation, such that the discrete flow segments do not experience simultaneous communication with the inlet and outlet ports. Regarding a variable flow range for maximum efficiency, pump 190 should have a minimum flow rate less than or equal to about 5% greater than the minimum rate of liquid flow into the separator 150. The pump 190 should have a maximum flow rate greater than or equal to about 5% greater than the maximum rate of liquid flow into the separator 150. While other variable flow rates are possible to use with pump 190, such ranges may result in a less efficient flow and use of the pump 190 in the collection of liquid fractions from the cyclone separator 150. Fixed rate pumps must be sized for the maximum volume of modifier expected for use in the system plus a small increment. Variable flow pumps are not required any time the entering liquid flow rate is nearly constant. Pump 190 should also have a low upswept internal volume. It is desirable to exchange fluid in the pump 190 rapidly to prevent mixing with subsequent peaks. In that regard, pumps 190 with low dead volumes and high compression ratios are more desirable.

Figure 2:
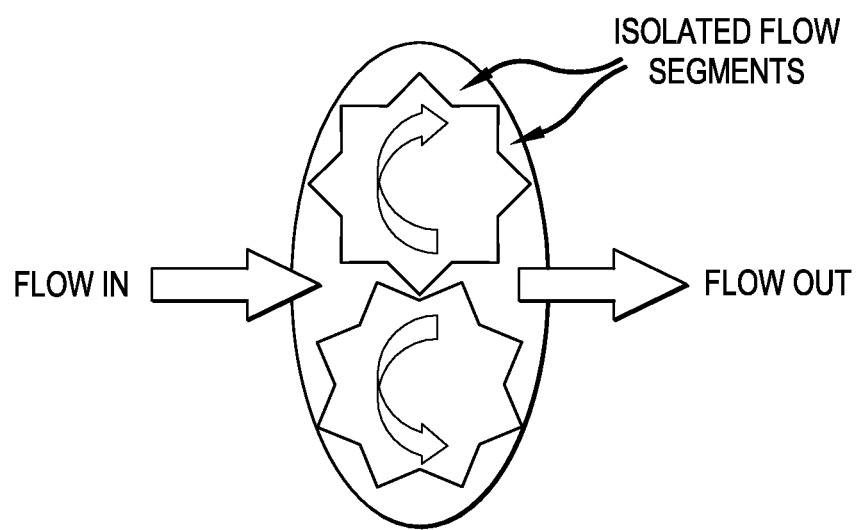
FIG. 2 is a diagram of a typical external gear pump that could be implemented in a system of the embodiments.
Figure 3:
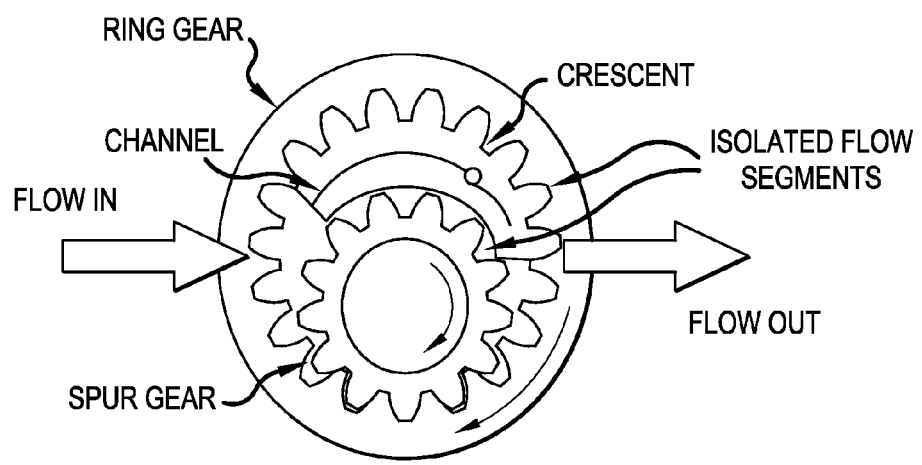
FIG. 3 is a diagram of a typical internal gear pump that could be implemented in a system of the embodiments.
Figure 4:
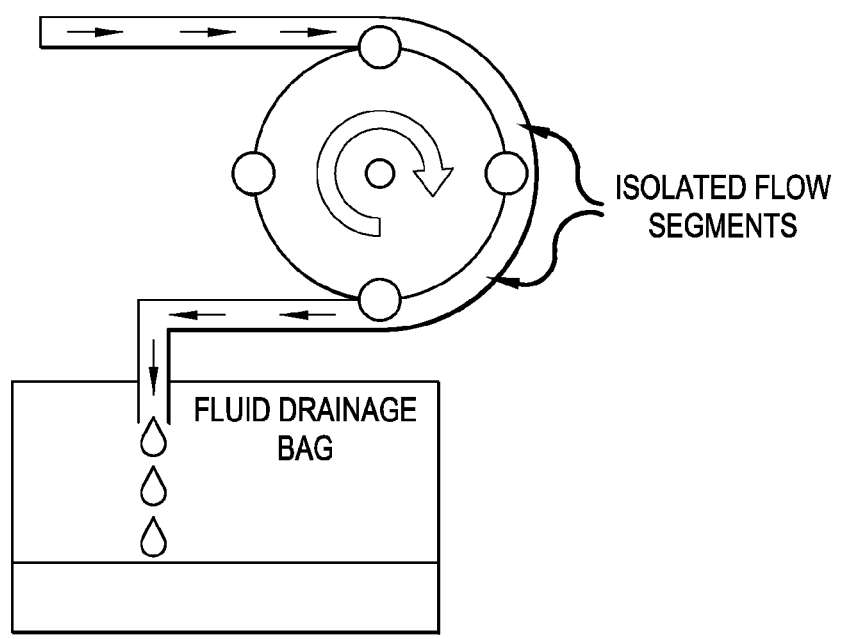
FIG. 4 is a diagram of a typical peristaltic pump that could be implemented in a system of the embodiments.
Figure 5:
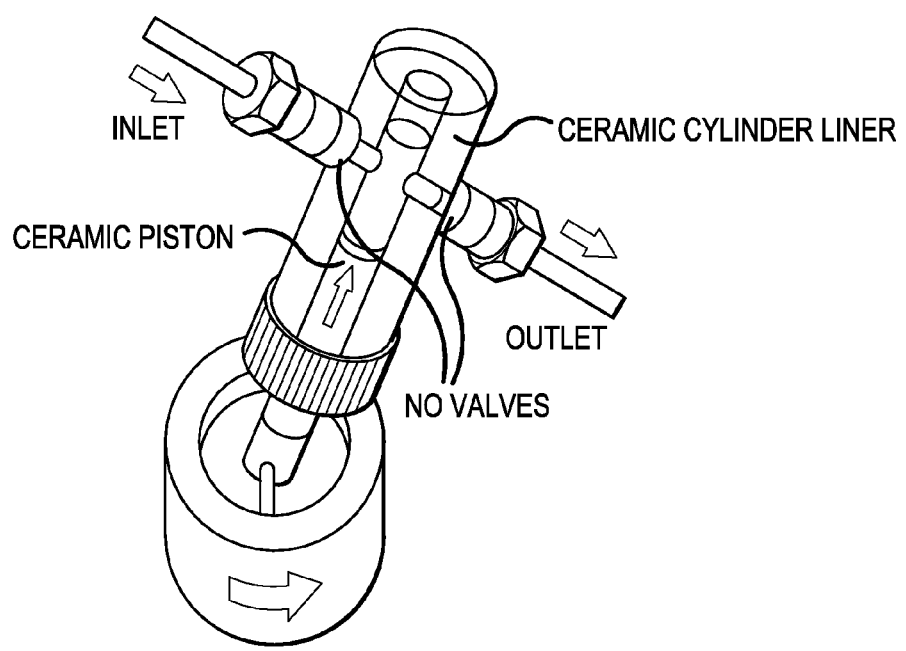
FIG. 5 is a diagram of a typical valveless pump with rotating ceramic piston that could be implemented in a system of the embodiments.

Examples of acceptable pumps that fulfill these criterion include:

a) Gear pumps: FIGS. 2 and 3 illustrate examples of external and internal gear pumps respectively. In such pumps, flow segments are isolated from the inlet port by rotation of a gear arrangement and in such a manner that they are delivered to the outlet port but cannot return to the inlet port due to close fitting mesh of the gears.

b) Peristaltic pumps: FIG. 4 illustrates a standard peristaltic pump where flow segments are isolated by pairs of rollers which compress a flow tube at multiple points to isolate flow between the inlet and outlet. Rotation of the roller wheel causes flow in the direction of rotation.

c) Valveless ceramic pumps: FIG. 5 illustrates an example of a ceramic pump. These pumps operate by both translating and rotating a ceramic piston within a very close tolerance sleeve or cylinder with a ceramic cylinder liner. A flat notch in the piston top provides an isolatable volume that is transferred between ports. The notch is exposed to the inlet as the piston is withdrawn from the cylinder and exposed to the outlet as the piston is pushed into the cylinder. As the piston rotates its rounded side provides a seal for the opposing port.

d) Active valve reciprocating pumps. Exemplary active valves may be a variety of solenoid isolation valves and/or rotary ball or switching valves that synchronize with the movement of a piston in a reciprocating pump such that only the inlet is available to flow during an aspiration stroke of the pump and only the outlet is available during a delivery stroke of the pump.

Pump 190 regulates flow from the separator 150 via positive displacement to outlet conduit 200. The outlet conduit 200 is of known internal volume and transfers fluid at block 630 to collection system 210. The collection system 210 is comprised of one or more collection containers attached to outlet conduit 200 either by a valving arrangement or robotic fraction collector capable of switching between collection containers as different peaks flow volumes enter the collector.

For high pressure separators 150, pump 190 provides significant restriction to the flow of both liquid and vapor. Only flow passed by the positive displacement operation of the pump 190 is allowed to outlet conduit 200. Hence incompressible liquid is passed at the pump flow rate while compressible vapors are passed at the flow rate multiplied by an expansion factor based on the separator 150 pressure and the downstream restriction of outlet conduit 200 and collection system 210.

Certain other alternative embodiments are also shown in FIG. 1. Pump 220 is a makeup pump option to the collection system. Solvent reservoir 230 supplies pump 220 and a conduit 240 introduces the makeup flow into the collection stream. Make up flow can be introduced at block 540 for many reasons, as determined at block 530, including:

Separations that require only C02 that need a liquid carrier for collection;

Solvent loss due to optional heater 120;

Higher solvent flow needed for timely flushing of gas-liquid separator 150;

Providing a minimum liquid flow to pump 190 to maintain a hydraulic pump seal to vapor flow; and Providing higher or lower viscosity liquid phase to improve pump 190 efficiency.

In FIG. 1, the delivery point of makeup solvent is shown immediately prior to optional heater 120, but this point can actually occur in any position after a SFC system 100 detector and prior to entry to separator 150, depending on the actual application.

In other embodiments, FIG. 1 illustrates an isolation valve 250. This valve 250 may be added as determined at block 590 to be used in combination with pump 190 when additional flowstream isolation is required, for example, to allow collection liquid accumulation within separator 150 while valve 250 is closed, followed by rapid drainage by opening the valve 250 and operating the pump 190 at high speed at block 600. Such operation at block 600 to actively control exit flow path for separated liquid can further prevent the inadvertent introduction of vapor into the collection flow stream and improve the service lifetime of the pump 190.

Figure 6:
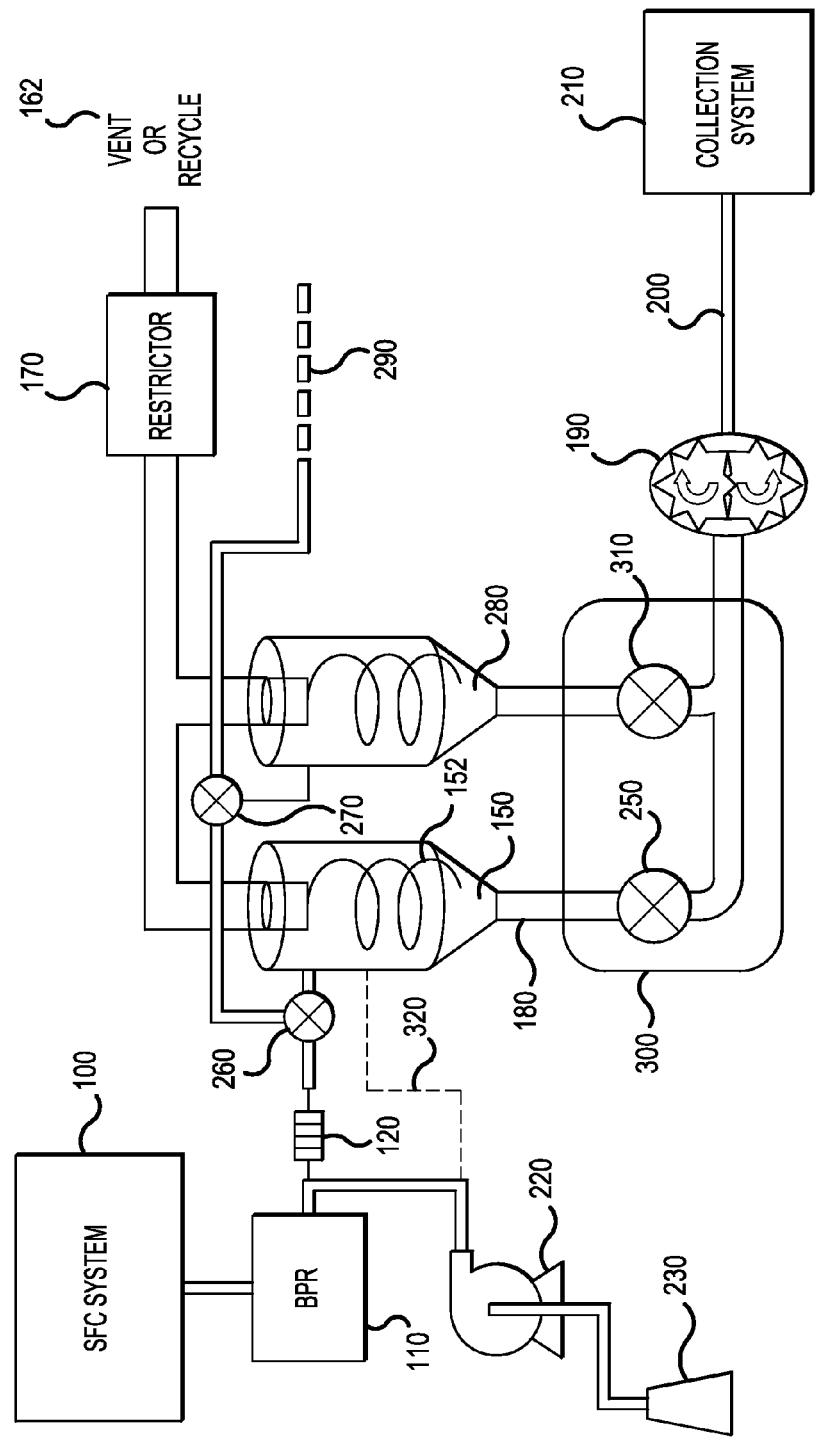
FIG. 6 is a diagram of an alternative embodiment that includes multiple separators connected by a manifold in an SFC system.

FIG. 6 illustrates an alternative embodiment of the invention. The embodiment adds diverter valves 260 and 270 to direct flow to enter or bypass separators 150 and 280 respectively. Ellipsis 290 represents the extensibility of additional diverter valves and separators into the flow system so that separate fraction peaks may be directed to one or more individual separators. Manifold 300 provides support for individual isolation valves 250 and 310 to select flow from any or all separators at one time. Manifold 300 can be extended to handle more than the two separators 150 and 280 shown. When a particular separator 150 or 280 is selected, a corresponding isolation valve 250 or 310 opens and an exemplary pump 190 entrains the collected liquid to the collection system 210. The ability to activate more than one separator at a time allows multiple separators to handle flows larger than a single separator could handle. A separate bank of separators could then handle the next peak of the flow stream. Except for a very small volume of liquid common to the manifold, no carryover between peaks should be seen if a separate separator is used for each peak.

Figure 7:
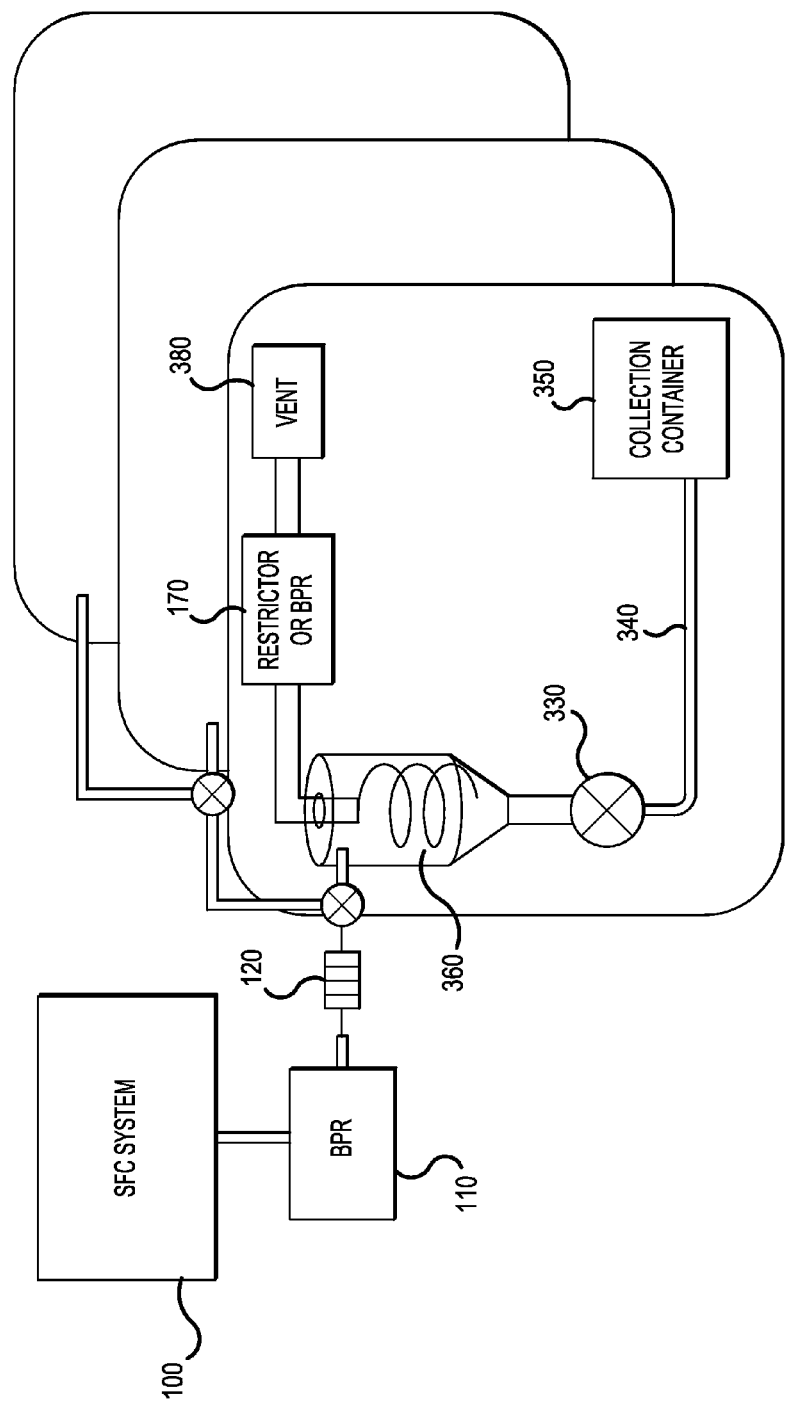
FIG. 7 illustrates a process flow diagram of a prior art SFC collection system.

An alternate use of FIG. 6 would be to alternate collection of successive peaks between separators 150 and 280. When one peak collection is complete, a rapid rinse is added to wash the separator before the next use. A new peak triggered during this wash period would be stored in the alternate separator. At the end of the wash cycle, drainage would switch to the alternate separator. As an example, rinse solvent could be delivered via a conduit such as path 320 as a split flow or valve directed flow from the makeup pump In comparing the embodiments of the invention with existing collection methods, such as high pressure separator drains, FIG. 7 shows a conventional cyclone separator array used as the collection system for an SFC System. In the figure, three cyclone separators are arranged serially with three way solenoids which determine whether a cyclone receives flow or is bypassed. In this serial arrangement, the most upstream valve to open to the cyclone will receive all the flow. Conventional cyclone separators tend to be operated at relatively high pressures (e.g. 10 to 20 bar) and have large volumes to contain a large number of pooled fractions of the same peak from repeat injections of sample. Eventually the separator must be emptied. This is performed by opening isolation valve 330 which utilizes the high backpressure of the separator to rapidly force liquid into conduit 340 to final collection container 350. The sudden release of pressure from the liquid can easily cause a violent outgassing of dissolved $CO_2$ from the liquid, both in the conduit 340 and in the separator itself. Rapid expansion of the gas in the conduit 340 causes re-aerosolization of the liquid as it sprays from the conduit 340 into collection container 350. Outgassing within the separator causes splashing and/or foaming of the stored liquid which is a source of contamination to the separator walls which typically requires manual cleaning—an arduous process.

Allowing valve 330 to remain open too long provides the full flow of $CO_2$ into conduit 340 and to collection container 350 which increases the mechanical requirements of the collection container 350 to meet safety certification. Alternatively, the user may choose to vent the pressure to a lower state where the liquid emerges with less force after opening the valve 330. This process clearly slows the processing throughput since fractions cannot be collected at the lower pressure. Further the ability to recycle $CO_2$ is diminished at lower pressure.

By adding the exemplary active pumping mechanism 190 and process into a prior system between valve 330 and collection container 350, the pump 190 does not pass liquid or gas except at the volumetric control setting. Thus pressure is maintained in the separator even as liquid is withdrawn at a reasonable rate. While some outgassing may occur in conduit 340, the dramatically lower flow rate prevents catastrophic aerosolization as in the former case. There will be a ten- to twenty-fold expansion of vapors pumped into conduit 340, but again not sufficient to prevent the filling of the liquid flowstream into container 350. As a result of embodiments of the invention, conventional cyclones may be sized smaller since they may be emptied more frequently or even continuously under much more controlled circumstances.

Figure 8:
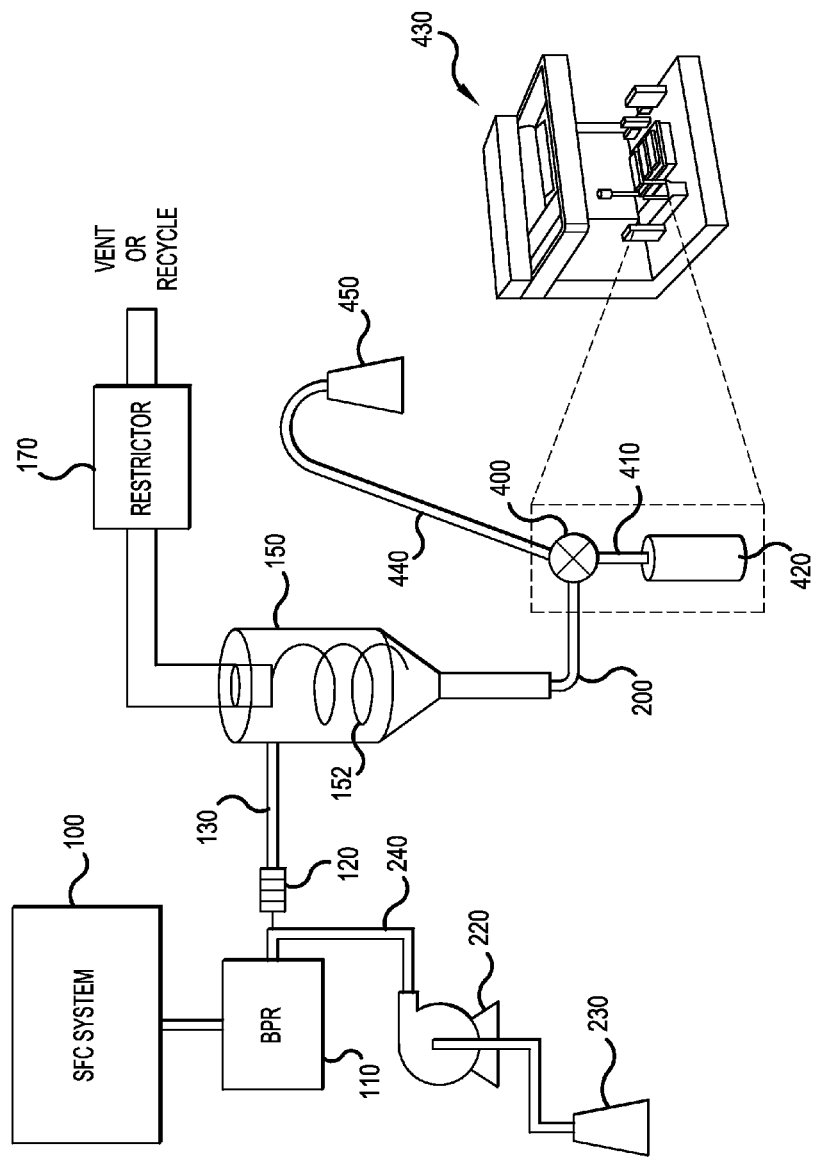
FIG. 8 illustrates a process flow diagram of an additional prior art SFC collection system.

FIG. 8 illustrates a commercial continuous separator which makes use of a small low pressure gas-liquid separator to provide a continuous stream of recovered liquid to a robotic fraction collector. In this arrangement, the gas-liquid separator 150 is designed to be continuously drained at a rate at least slightly greater than the rate liquid enters. As a result there is no pooling of liquid within the separator 150 and consecutive peaks will become entrained within outlet conduit 200 and pass to robotic fraction collector 430 with minimum remixing. The drain rate is controlled by careful selection of properties for BPR 110 and outlet conduit 200 which acts as a passive restrictor to flow. outlet conduit 200 delivers its flow to divert valve 400. As shown in the blowup section, robotic collector 430 conveys divert valve 400 to various locations of the robotic bed using a three axis robotic mechanism. When divert valve 400 is positioned over collection container 420 located in a rack on the stationary bed and the valve is activated, liquid flow proceeds through short probe or needle 410 into the collection container 420 and a peak is collected. When divert valve 400 is deactivated, flow is passed to bypass conduit 440 and eventually collected in pooled waste container 450.

Timing is a critical element of success for fraction collection. A predictable time window for the peak flow segment to travel from the detector, which triggers the collection to the divert valve which directs it to the proper collection container is essential. This timing can be affected by several factors, including:

Flow rate of the liquid phase
Viscosity of the liquid phase
The drain time for liquid entering separator 150 to arrive at outlet conduit 200
The amount of vapor entrained in outlet conduit 200
The restriction difference between the collection and bypass paths.

Performing SFC separations presents many challenges not faced in other types of chromatography or systems for separating gasses and liquids. While it is known to select a set of conditions of backpressure and restriction to meet any fixed state of flow and viscosity, a significant difficulty arises dramatically as these conditions change. The difficulty is best illustrated using an example. For a 100 mL/minute preparative SFC, total flow is typically maintained at the maximum 100 mL/min rate. Modifier flow is generally selectable form 5% to 50% of the total flow rate. Modifiers have different viscosities. In this example two common modifiers will be compared-methanol (MeOH, 0.58 cP) and isopropanol (IPA, 2.43 cP). The $CO_2$ of the mobile phase will expand in volume approximately 500 fold between the flow conditions before the BPR and atmospheric pressure. Hence a flow of 100 mL/min pure $CO_2$ in the system would reach 50 L/min at the vent, while the max flow would be 25 L/min at 50% modifier composition. Similarly, the maximum liquid flow would range between 5 and 50 mL/min from the chromatography system.

Figure 9A:
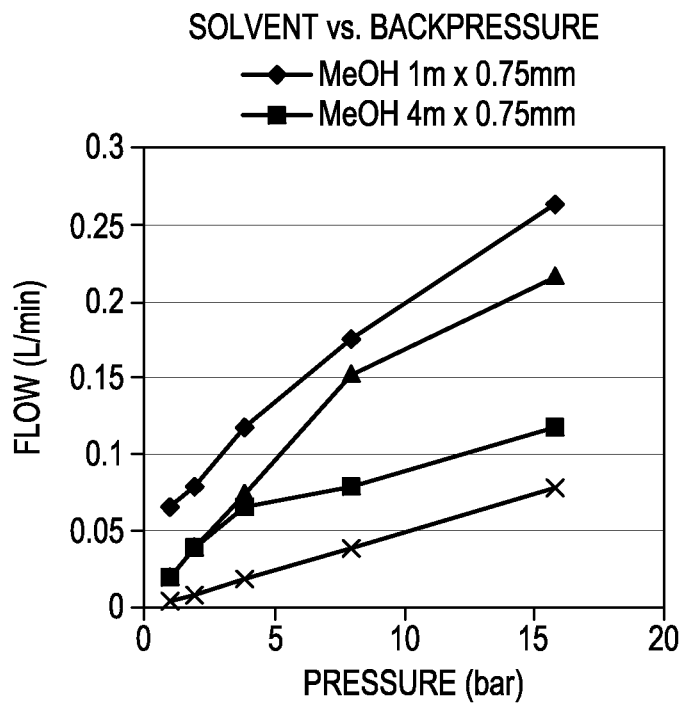
FIGS. 9A and 9B are graphs showing calculations of liquid and vapor flows through a pipe at various pressures.
Figure 9B:
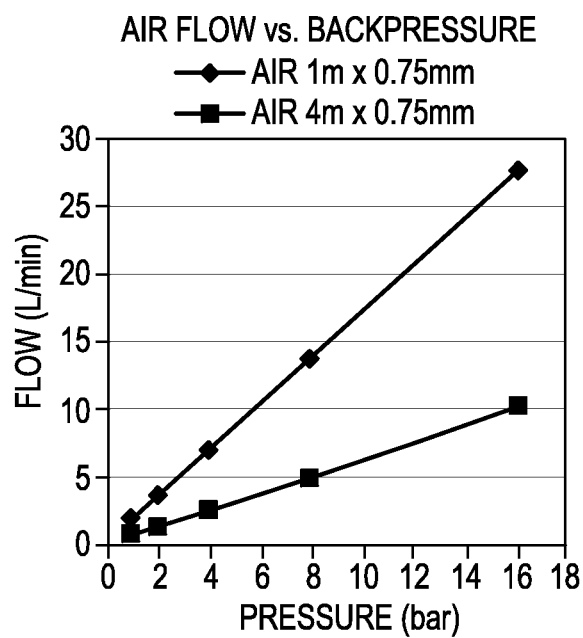

FIGS. 9A and 9B are graphs showing calculations of liquid and vapor flows through a pipe at various pressures. In this example, two variations of outlet conduit 200 were selected with different restrictions. Each tube has a smooth inner diameter of 0.75 mm. The tubes differ in length, 1 m and 4 m respectively. The tubes have volumes of 0.44 mL and 1.76 mL respectively. For each fluid, MeOH, IPA and air, the volumetric flow rate at the low pressure end of the tube is calculated. Non-linearity of the graphs is due to the flow type transitioning between laminar and turbulent flow regimes at different pressures.

The first issue that can be seen by comparing the two graphs is that the scales differ by more than an order of magnitude. For example, the 1 meter tube at 2 bar [29 psi] pressure difference allows 0.062 L/min of MeOH flow, 0.038 L/min IPA flow and 2.83 L/min air flow. Hence the rate of flow in the tube simply based on pressure difference across a tube restrictor highly favors vapor flow. This becomes an issue since some vapor must enter outlet conduit 200 to insure all liquid is drained from separator. A significant amount of vapor delivered to probe 410 in FIG. 8 can result in re-aerosolizing the liquid. It should further be pointed out that the 38 mL|min flow of IPA at this pressure is insufficient to pass the 50 mL|min flow delivered to separator 130 at 50% modifier flow. Hence, while this tube would work for MeOH, a different restrictor must be installed for IPA which will only increase the issue of high maximum vapor flow. The 1 m tube used in the example represents an optimistically short length to route though the robotic sample collector. In practice, 3-4 meter tubes are required for operation. As can be seen in comparison of graph 9A and 9B, this will require substantially higher pressure or tube diameter to allow the proper flow ranges of liquid. MeOH and IPA also require different restrictors for the same flow range due to their different viscosities.

Even for cases where the same solvent is used in all separations, operation of the SFC system in a gradient mode—where modifier is continuously varied between the minimum and maximum compositions in each separation—can cause serious problems with timing. This is due to the considerable difference between the vapor and liquid flow rates in outlet conduit 200. At low modifier compositions, high volumetric flow rates propel liquid aliquots though outlet conduit 200 at high speed. Peaks emerging at low modifier composition reach diverter valve 400 in a shorter time period than peaks emerging at high modifier composition. It is quite difficult to predict the actual timing difference since higher percentage solvent vaporization occurs in heater 120 at low composition and the liquid viscosity can change dramatically with solute loading.

To overcome these timing variations in the described commercial system, the manufacturer has recommended using the same modifier in most cases. In addition, a modifier makeup flow system comprised of reservoir 230, pump 220 and conduit 240 is implemented. The makeup flow system provides a reverse gradient of modifier to insure that the volumetric flow of modifier into the separator remains constant so that drain rates and flow timing do not change over the course of a gradient. The obvious downside of this approach is that a great deal of unnecessary solvent is added to the system which must be collected and evaporated to process the fractions. This severely diminishes one of the major benefits of SFC—its use of low levels of organic solvents. A superior solution is shown by implementing the disclosed invention.

Referring again to the preferred embodiments of the invention in FIGS. 1 and 6, insertion of pump 190 with proper specifications and conditions into outlet conduit 200 dramatically changes the flow dynamics. Even if pump 190 flow is set, for example, to 55 mL/min—a rate 10% above the maximum liquid flow as previously described—it would expand only 3-fold to 150 mL/min of vapor at atmospheric pressure. This represents a reduction of greater than 17-fold or less than 6% of the volume of vapor passed to the collection system by the tube restrictor. The 150 mL/min flow rate described above would occur only at the probe tip. At the beginning of outlet conduit 200, the flow would be closer to the original 55 mL/min. As a result, if the fraction took 6 seconds to reach the probe when the tube was liquid filled, it would only take approximately 3 seconds in the presence of 90% gas. This timing variance is well within an acceptable range for fraction collection.

Finally, the pressurization of the gas-liquid separator is generally higher than the pressure of flow stream expelled by pump 190 with the pump acting as an active flow restrictor in the flow path. However, a restrictive flow outlet conduit 200 at the outlet of pump 190 in combination with a surge of liquid flow or a high viscosity liquid phase may cause the pressure in flow outlet conduit 200 to exceed that of the separator. The flow rate in flow outlet conduit 200 is virtually unaffected by such a pressure gradient reversal, since the pump 190 has the ability to lift the pressure in order to maintain the flow rate. This ability of pump 190 to switch from active restrictor to active pressure source allows a very large dynamic range of flows and viscosities to be managed within a relatively precise delivery window.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A system, comprising:
    a chromatographic system comprising a separation column configured to elute solutes of samples injected into a flow stream;
    a gas-liquid separator configured to receive and separate a pressurized biphasic flow stream from the separation column and to deliver flow to at least one exit port enriched in liquid phase composition;
    a low restriction inlet conduit in communication with the at least one separator exit port enriched in liquid phase composition;
    a positive displacement pump comprising an inlet port in communication with the inlet conduit and an outlet port in communication with an outlet conduit; and
    a collection system connected to the outlet conduit.

2. The system of claim 1, wherein the pump receives flow from the inlet conduit and transfers discrete flow segments between the pump inlet port and the pump outlet port creating an average flow rate which completes travel through the outlet conduit in a predictable time window.

3. The system of claim 2, wherein the pump is configured to transfer the discrete flow segments such that a discrete flow segment in communication with the pump inlet is never in simultaneous communication with the pump outlet.

4. The system of claim 1, wherein the inlet conduit is attached to the gas-liquid separator to enable separated liquid flow to gravity drain into the inlet conduit.

5. The system of claim 1, further comprising,
    a valve, located on the inlet conduit, for actively controlling the flow stream from the gas-liquid separator prior to entering the pump by synchronizing with movement of the pump, such that only the pump inlet port is available to flow during an aspiration stroke of the pump and only the pump outlet port is available during a delivery stroke of the pump.

* * * * *